Feb. 9, 1960   R. K. JAMENTZ   2,924,168
Roasting Rack
Filed Feb. 13, 1956
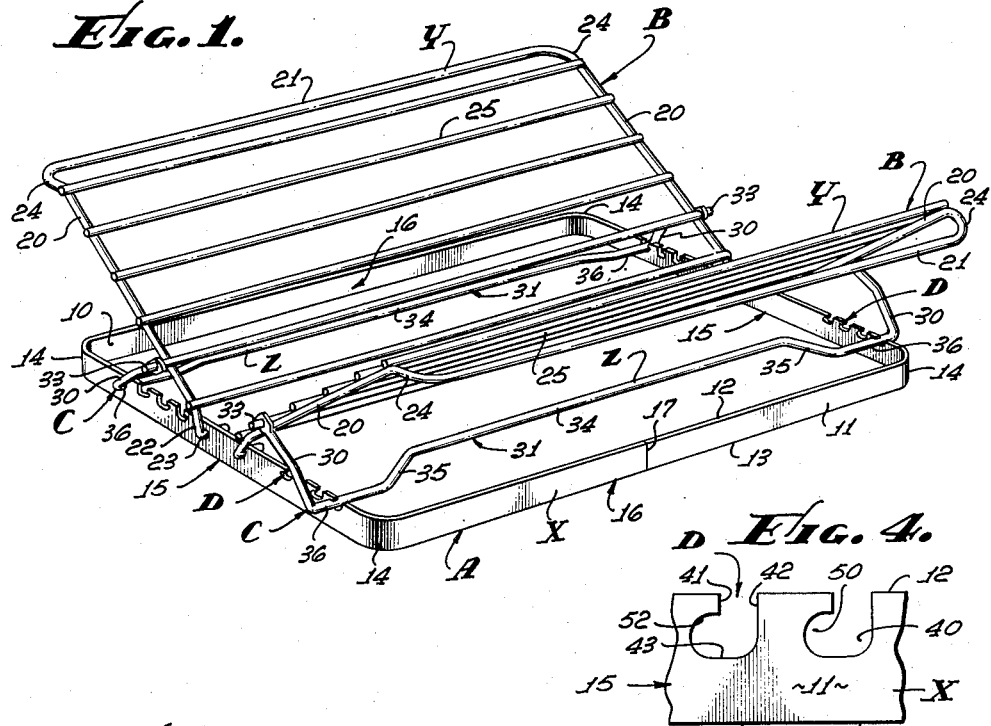
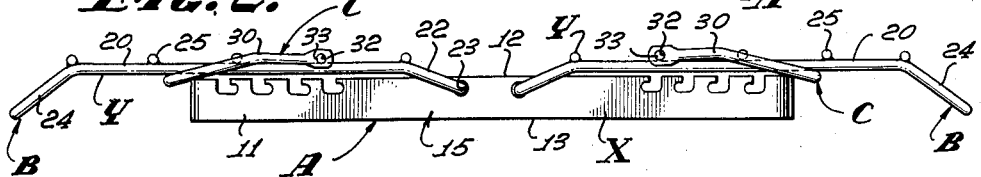
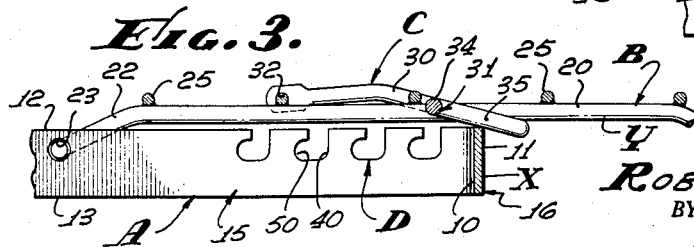
INVENTOR.
Robert K. Jamentz
BY
Maxwell & Maxwell
AGENTS.

United States Patent Office 2,924,168
Patented Feb. 9, 1960

2,924,168

ROASTING RACK

Robert K. Jamentz, Los Angeles, Calif.

Application February 13, 1956, Serial No. 565,213

1 Claim. (Cl. 99—426)

This invention has to do with a roasting rack, or a grid type construction for use in connection with stove ovens, and is particularly concerned with a new and improved construction that is adapted to be handled without collapsing.

This invention is an improvement over U.S. Patent No. 2,144,278, entitled "Roasting Grid" and is provided to be removably mounted in a stove oven for roasting poultry, meats, and other roasted foods whereby the natural juices will be sealed therein, etc., in a most advantageous manner. Devices of the type under consideration have been provided after the teaching of the above-mentioned patent. Although these devices serve the general purpose for which they are intended to be used, they are not altogether satisfactory since they are subject to collapsing when in use. That is, if they are lifted by the side portions thereof, they fold inwardly, causing the roast to be displaced from the proper or desired position. Further, collapsing of the roasting rack will often result in a person losing his grip therewith and in dropping of the device and the roast carried thereby.

In view of the foregoing, it is a general object of this invention to provide a roasting rack, or the like, which will not collapse or fold when it is being lifted or handled in a normal manner.

An object of this invention is to provide a rack of the character above referred to that has food supporting leaves and means locking said leaves in the desired operating positions.

It is still another object to provide a roasting rack of the type under consideration that has food supporting leaves that can be selectively positioned and locked against accidental displacement to the end that it can withstand normal use and handling without collapsing or folding.

It is also an object of this invention to provide a quickly and easily adjustable means whereby the leaves of the roasting rack can be locked in the selected operating positions, all with a minimum of mechanism and so that the device is extremely inexpensive of manufacture while at the same time, it is highly practical and effective for the purpose intended.

The various objects and features of my invention will be fully understood from the following detailed description of a typical preferred form and application of my invention, throughout which description reference is made to the accompanying drawings, in which:

Fig. 1 is a perspective view of a roasting rack embodying the features of the present invention, showing the leaves of the rack extended or raised to a position for supporting a roast. Fig. 2 is an enlarged detailed end view of the structure shown in Fig. 1 showing the leaves in a collapsed or downwardly folded position. Fig. 3 is an enlarged sectional view of a portion of the structure taken through the center portion of one of the leaves thereof, and Figs. 4 and 5 are enlarged detailed views of a portion of the structure illustrating the manner in which the support for the leaves is engaged and locked in position by the means that I have provided.

The roasting rack forms a food support and is adapted for removable placement in an oven of a stove (not shown). The rack is collapsible, and when in operating condition, is characteristically V-shaped, the angle of V depending upon the size and shape of the food to be roasted. That is, the rack presents a V-shaped support that is proportioned and adjusted to meet the particular shape of the food involved.

In preparing food such as fowl, the skin is tightly tied around the neck, and the legs and wings are trussed in the usual manner, the opening of the fowl through which the dressing is introduced being sewed to completely close the same. During the roasting process, it will be apparent that the natural juices of the fowl will be directed downwardly towards the lower breast portions, maintaining the same at all times in a moist condition. Further, as the juices are sealed within the roast, very little will escape therefrom, and for that reason very little or no basting is ordinarily required.

The rack of the present invention is collapsible so that the elements thereof will lie substantially flat and at the same time will be adjustable for the support of various shaped and proportioned foods. As illustrated in Fig. 1 of the drawings, the roasting rack involves generally a base A, a pair of like food carrying leaves B, a support C for each of the leaves, and releasable lock means D for adjustably positioning the supports C. The base A is the main supporting element of the structure, the leaves B being pivotally carried by the base A to be supported in angular relationship through the supports C. The lock means D is a releasable lock means and secures the supports in position to maintain the leaves in the desired operating position.

The base A is the main frame part of the device and is a flat horizontally disposed member adapted to have supporting engagement with an oven tray, or like part. As shown, the base A is preferably rectangular in plan configuration, and it may be made or formed in any suitable manner and of any suitable material. I have found that a simple rectangular base bent from an elongate strip X of flat metal stock serves the purpose very nicely and provides the desired body of material to form the means involved in the structure as hereinafter described. The strip X has flat inner and outer vertically disposed sides 10 and 11 and has upper and lower edges 12 and 13. The strip X is bent into a rectangular piece having corners 14 defining end rails 15 and side rails 16. The corners 14 are 90° bends, and the ends 15 and sides 16 are straight parallel elements, the strip X being secured or butted at 17.

The pair of like food carrying leaves B are provided for the support of the food to be roasted and are substantially flat elements that are normally horizontally disposed at the top of the base and are adapted to be tilted relative to each other in order to form a V. The leaves B are pivoted to the end rails 15 of the base A centrally thereof and on axes intermediate and parallel with the side rails 16. The leaves B may be pivoted on a common axis but are preferably pivoted on individual axes located substantially adjacent each other and so that the leaves B extend outwardly and laterally away from said axes.

As shown, the leaves B are alike and each is a gridlike part composed of wires or rods Y or like elements presenting an open framework or network of elements characteristic of racks of the type under consideration. Each leaf B overlies approximately one-half of the base A to be substantially coextensive with the length of the base and preferably extending substantially beyond the side of the base. In practice, the leaf B has spaced parallel end members 20, one at each end of the base A and a side member 21 spaced outwardly and laterally of the side rail 16. The inner end portions 22 of the members 20 are downwardly deflected and are inwardly turned to be carried in bearing openings 23 in the end members 15 of the base A. The outer end portions 24 of the members 20 are downwardly deflected and are inwardly turned to integrally join with the side member 21. Thus, the main portions of the members 20 are normally parallel with the plane of the base A to occur at the top side thereof, and the member 21 is spaced downwardly and away from the plane of the leaf B in order to provide a handle portion clear of the roast for manipulating of the device when a roast is carried thereby. In practice, suitable additional food carrying rods 25 extend parallel with the member 21 and with the pivotal axis of the leaf B and are supported at their end portions by the end members 20 of the leaf B.

A support C is provided for each of the leaves B for angularly relating and holding the leaves B in upwardly inclined positions to form a V. As shown, each support C is a simple body made up of a length of wire or rod Z or like element to form a pair of spaced parallel legs 30 joined by a spacer 31. The inner end of each leg 30 is formed with an opening 32 to receive a trunnion 33 projecting from the leaf B. The trunnion 33 is preferably formed by the extension of one of the rods 25, and the leg 30 depends and swings from the trunnion 33. The outer ends of the legs 30 are joined by the spacer 31 so that they operate together and so that they can be simultaneously manipulated as hereinafter described. A feature of the support C is the intermediate portion 34 of the spacer 31 which is offset from the outer ends of the legs establishing diagonal portions 35 that overlie the side rail 16 for supporting engagement (see Fig. 3.)

The releasable lock means D adjustably and releasably positions the outer end portions of the legs 30 whereby the leaves B are maintained in the desired inclined position. As shown, a laterally and inwardly projecting foot 36 is provided at the outer end of each leg 30 and a supporting notch 40 is provided in the upper edge 12 of the strip X between the sides 10 and 11 thereof. There is a plurality of notches 40 in a series intermediate the pivotal axes of the leaves B and side rails 16 of the base A in order to provide for the desired adjusted positions. The notches 40 open upwardly, and it will, therefore, be apparent that lifting of the rack by the handle parts formed by the members 21 would ordinarily lift the feet 36 out of the notches 40 allowing the rack as a whole to collapse or fold inwardly. Therefore, and in accordance with the present invention, I have provided the lock means D.

The lock means D is a releasable means and is provided to prevent accidental release of the feet 36 from the notches 40. The means D involves generally the notches 40 and recesses 50 in the notches. The notch 40 enters the upper edge 12 of the strip X and has spaced side walls, there being an inner side wall 41 and an outer side wall 42. The bottom of the notch 40 is closed by a wall 43 joining the side walls. The recess 50 is in the notch 40 and enters one of the side walls thereof, preferably the inner side wall 41 adjacent the bottom wall 43. The recess extends inwardly toward the pivotal axis of the leaf B providing a downwardly faced abutment 52 adapted to engage with the top of the foot 36. The abutment 52 is preferably substantially parallel with the edge 12 of the strip X although it is of limited extent.

From the foregoing, it will be apparent that I have provided a very practical roasting rack of simple, inexpensive construction, and which will not, under ordinary circumstances, collapse or fold. By providing the releasable lock means D of the present invention, the feet 36 are retained in the notches 40 and recesses 50, thereby preventing lifting of the feet 36 when the rack as a whole is handled or lifted by means of engagement with the side members 21, or like handling. Since the side members 21 are offset from the plane of the leaves B, they provide a convenient handle portion by which the rack can be lifted and transported, all without collapsing or folding of the rack and without displacing of the food carried thereby. It will be apparent that it is a simple matter to select the desired notches 40 in order to gain the required incline of the leaf B in order to support various foods as circumstances require. It is to be observed that the trunnions 33 will be positioned inwardly of the notches and recesses that are used and engaged by the feet 36, so that when upward pressure is applied to the leaves B, the feet 36 are drawn inwardly toward recesses 50. It is in this manner that the legs are locked in engagement with the base so that the rack is not accidentally folded.

Having described only a typical preferred form and application of my invention, I do not wish to be limited or restricted to the specific details herein set forth, but wish to reserve to myself any variations or modifications that may appear to those skilled in the art and fall within the scope of the following claim.

Having described my invention, I claim:

A rack of the character described including, a base, a pair of shiftable supporting leaves pivotally carried by the base, supports for the leaves and each with a foot engageable with the base, and a releasable lock means securing the foot to the base, said means comprising a laterally disposed and upwardly opening notch in the base and having side walls, and an abutment projecting away from the pivotal connection of the base and leaves to overlie a portion of the notch and retain the foot when it is pulled into the notch toward the said pivotal connection by lifting of the rack by the leaves.

References Cited in the file of this patent

UNITED STATES PATENTS

| | | |
|---|---|---|
| D. 124,197 | Lynch | Dec. 24, 1940 |
| 1,092,698 | Curtis | Apr. 7, 1914 |
| 2,144,278 | Wallace | Jan. 17, 1939 |
| 2,208,945 | Miller | July 23, 1940 |
| 2,316,620 | Rees | Apr. 13, 1943 |
| 2,344,339 | Zwald | Mar. 14, 1944 |
| 2,376,640 | Wall et al. | May 22, 1945 |
| 2,520,389 | Ferris | Aug. 29, 1950 |
| 2,521,412 | Sack | Sept. 5, 1950 |

FOREIGN PATENTS

| | | |
|---|---|---|
| 13,596 | Great Britain | June 27, 1908 |
| 523,739 | Great Britain | July 22, 1940 |